United States Patent [19]

Skvarce et al.

[11] Patent Number: 5,231,908
[45] Date of Patent: Aug. 3, 1993

[54] APPARATUS FOR MOUNTING A SHEARING BLADE

[75] Inventors: Dennis Skvarce, Howell; John Graham, Sterling Heights, both of Mich.

[73] Assignee: Alpha Industries, Inc., Novi, Mich.

[21] Appl. No.: 954,436

[22] Filed: Sep. 30, 1992

Related U.S. Application Data

[63] Continuation of Ser. No. 772,350, Oct. 7, 1991, abandoned, which is a continuation-in-part of Ser. No. 699,210, May 13, 1991, abandoned.

[51] Int. Cl.⁵ .............................. B26D 1/06
[52] U.S. Cl. ............................ 83/698; 83/54; 83/300; 403/348; 403/353; 403/388; 411/418; 411/437
[58] Field of Search ............. 83/862, 698, 319, 54, 83/300, 699; 411/418, 437, 553, 539, 368, 147; 403/348, 353, 388, 48.1

[56] References Cited

U.S. PATENT DOCUMENTS

| | | | |
|---|---|---|---|
| 1,451,970 | 4/1923 | Taylor | 411/418 |
| 4,109,555 | 8/1978 | Borzym | 83/700 |
| 4,443,939 | 4/1984 | Motta et al. | 30/83 X |
| 4,872,384 | 10/1989 | Brozym | 83/698 X |
| 4,993,297 | 2/1991 | Nolan et al. | 83/310 X |
| 4,993,298 | 2/1991 | Chamulak et al. | 83/698 |

Primary Examiner—Frank T. Yost
Assistant Examiner—Kenneth E. Peterson
Attorney, Agent, or Firm—Krass & Young

[57] ABSTRACT

An apparatus for mounting a shearing blade specifically for use in a cut-off die set of the type used to cut tubing continuously emanating from a mill. The present invention is directed toward the shearing blade assembly used in conjunction with the notching blade of the cut-off die set. The subject device includes a mounting block fixed to the upper platen of the die set, a shearing blade mounted in a shearing blade cartridge, and a locking stud rotatably mounted on the mounting block which threadably engages and secures the shearing blade cartridge to the mounting block.

11 Claims, 4 Drawing Sheets

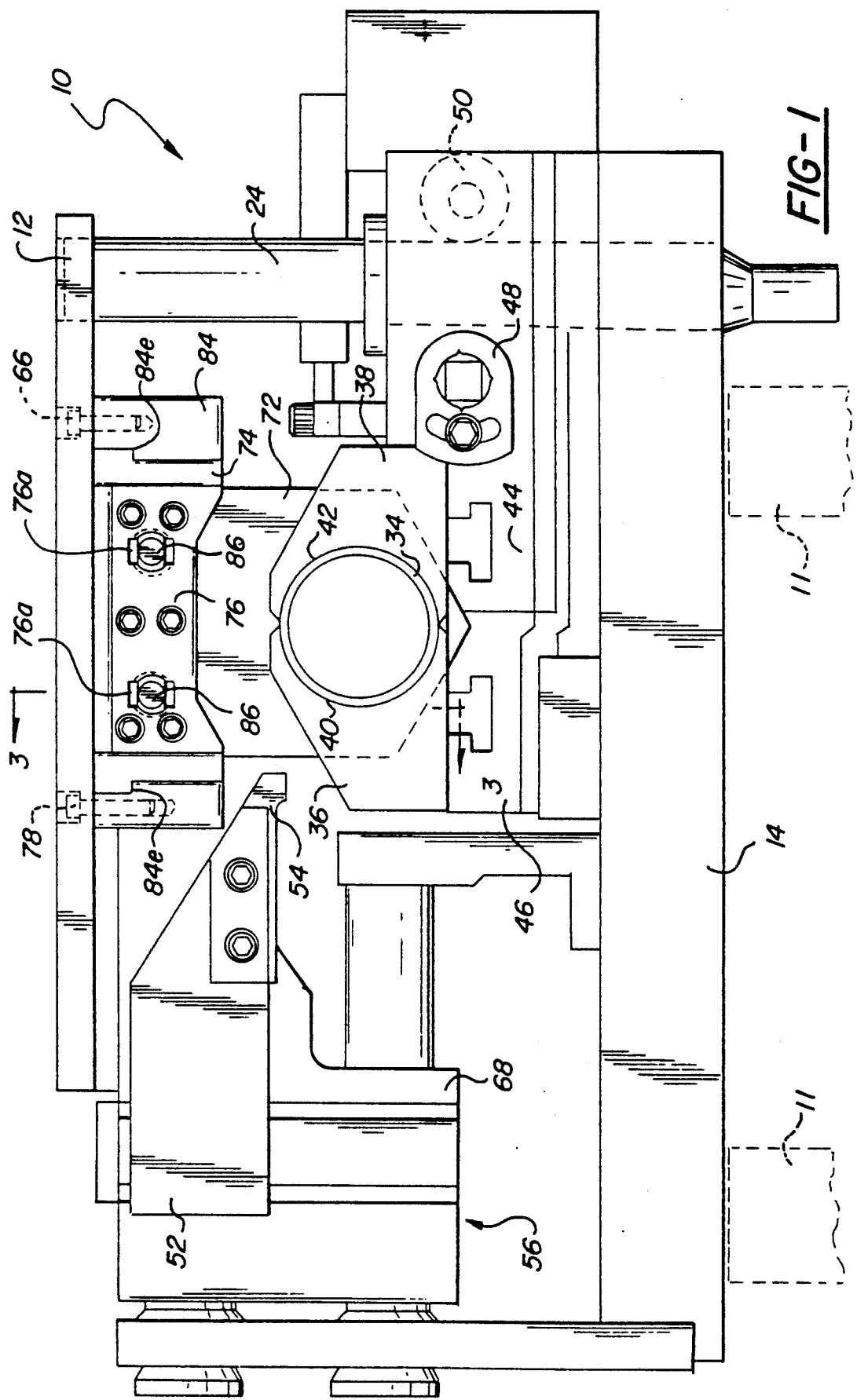

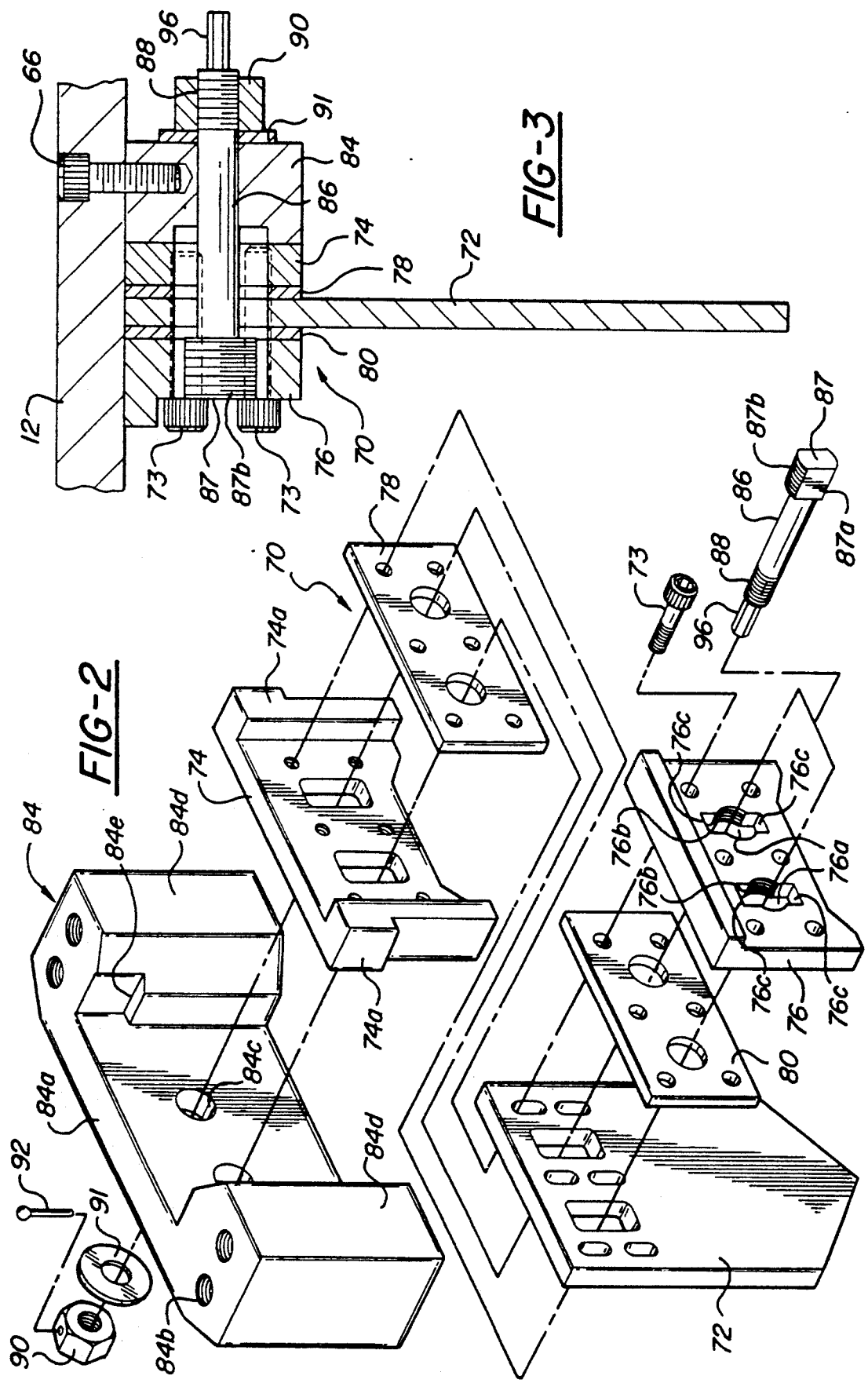

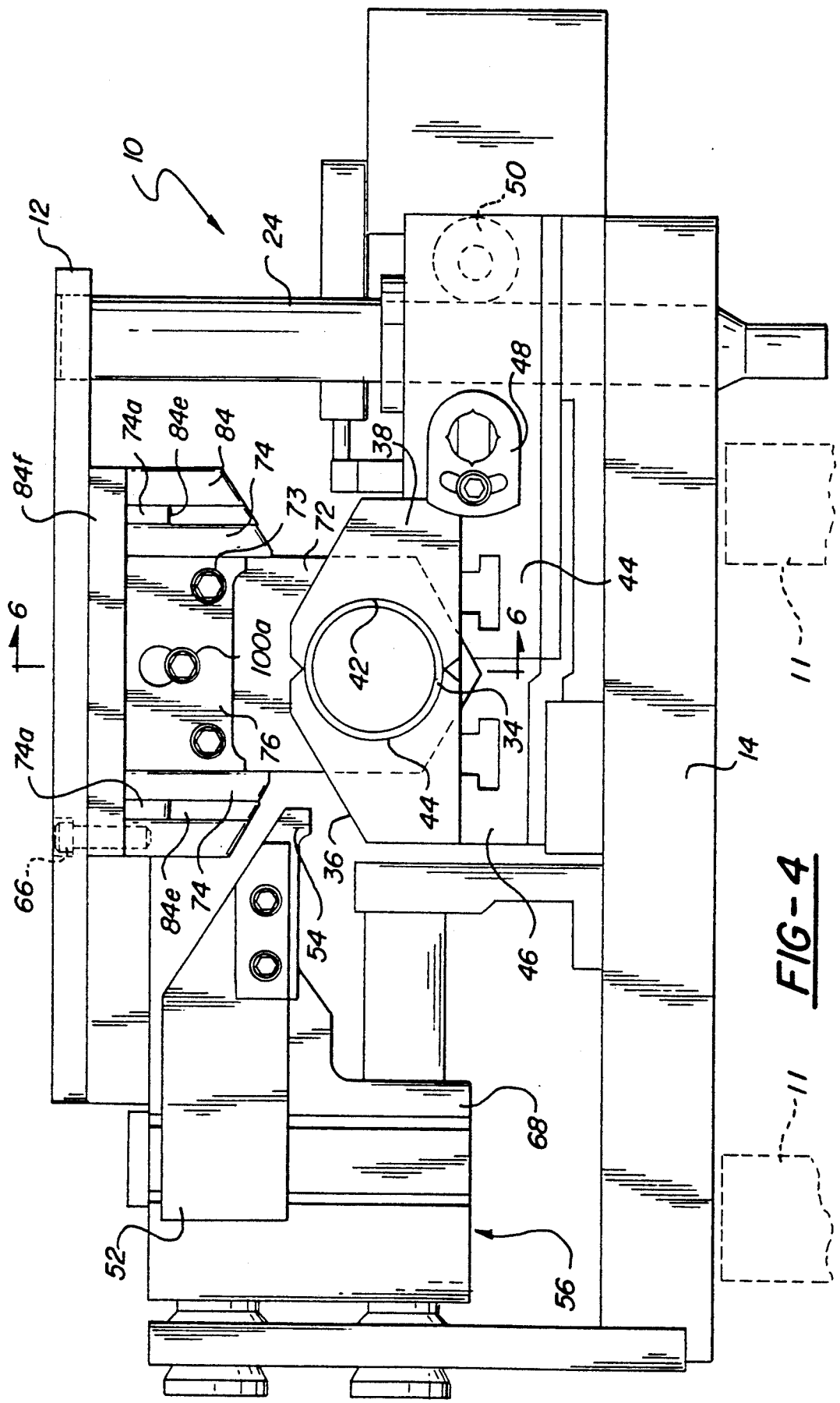

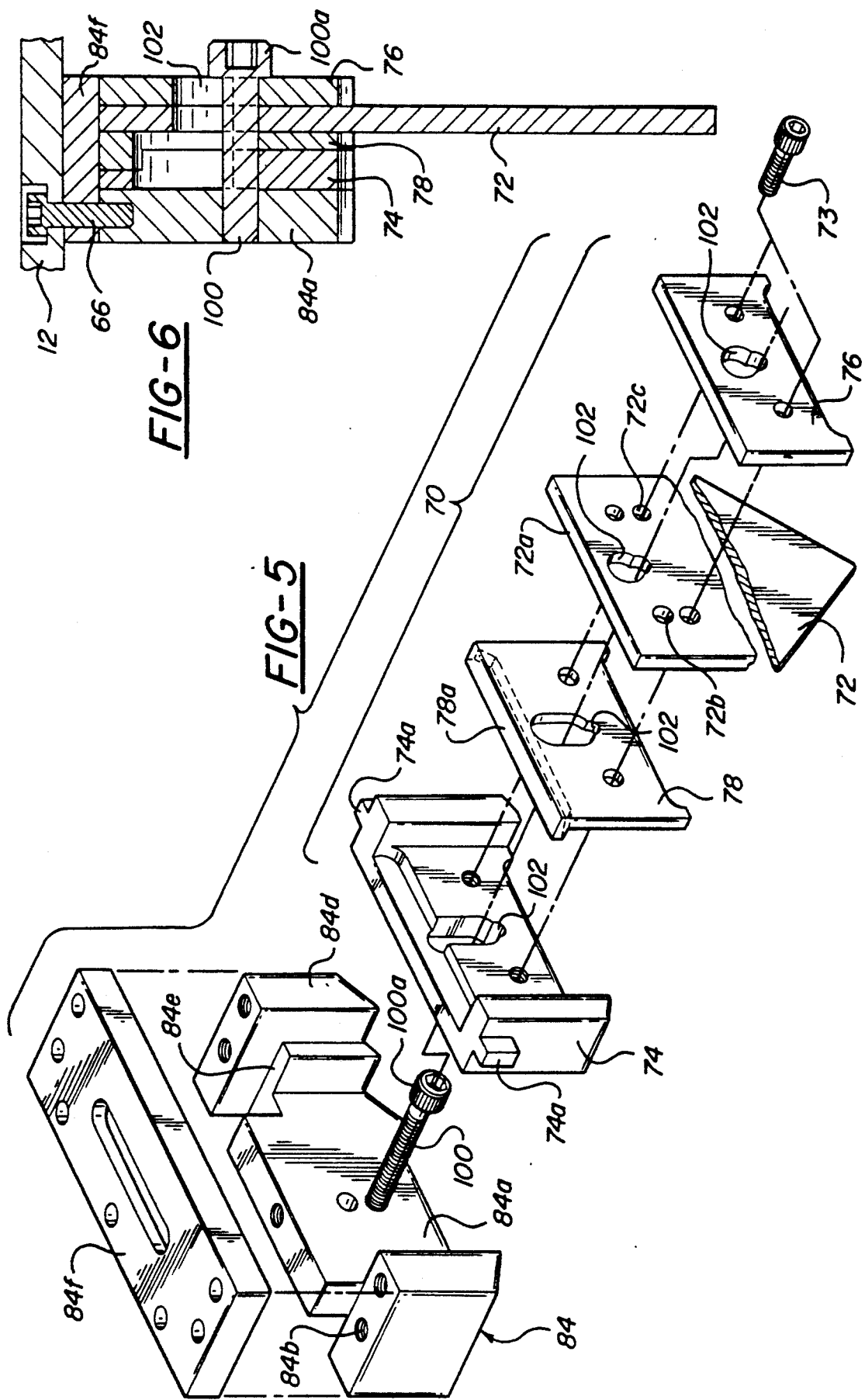

APPARATUS FOR MOUNTING A SHEARING BLADE

This is a continuation of co-pending application Ser. No. 772,350, filed on Oct. 7, 1991, now abandoned, which is a continuation-in-part of Ser. No. 699,210, filed on May 13, 1991, now abandoned.

INTRODUCTION

This invention relates to a cut-off die set of the type used in combination with a press to cut tubing and fabricated shapes as they are fabricated. More specifically, the present invention is directed toward an improved apparatus for mounting a shearing blade on a cut-off die set. These improvements further facilitate the installation and replacement of the shearing blade.

BACKGROUND OF THE INVENTION

A cut-off die set is used to shear a continuous length of tubing or other fabricated shape from a tube mill into useful and manageable sections. Typically the cut-off die set comprises upper and lower platens mounted on a pin and bushing assembly for relative reciprocal movement. A shearing blade fixed or mounted to the upper platen is used to sever the tubing into predetermined lengths. Both single and double cut die sets are known.

Eventually the cutting surface of the shearing blade becomes dull during the cutting operation. Once dull, the shearing blade must be sharpened or replaced in order for the die set to continue operating at maximum efficiency. During the time the shearing blade is removed for sharpening or replacement, the tube mill must be shut down. Time is of the essence in the tube-cutting industry as tubing continuously emanates from a tube mill at a high rate of speed. Any problems, delays or shutdowns due to repair or replacement of the cutting equipment result in lost production and revenue to the tube maker. Thus, any time saved during the changing or replacing of a shearing blade results in increased operation and production time of the mill.

Accordingly, it is an object of the present invention to reduce the downtime required for maintenance and/or replacement of the shearing blade, thereby increasing mill production by increasing the time period that the mill can be operational.

SUMMARY OF THE INVENTION

The present invention is directed to an improved apparatus for mounting a shearing blade on a cut-off die set. According to the invention, a mounting block having a depending plate portion and two depending side plate portions having notches thereon is mounted to an upper platen of the cut-off die set. A shearing blade cartridge including a back plate and a clamp plate adapted to sandwich the shearing blade therebetween is positioned on the mounting block. The back plate has outwardly extending flange portions which fit slidably into the notches in the mounting block to both position and support the cartridge assembly on the mounting block. Once inserted on the mounting block, the cartridge assembly is secured in position by a locking means.

In the first embodiment, a locking stud having a threaded end is mounted for rotation in the mounting block and used to secure the cartridge assembly to the mounting block. The threaded end has substantially parallel and opposite flat sides and opposite threaded sides defining a generally rectangular shaped cross section. The shearing blade cartridge has a threaded bore having opposite notched portions defining a generally rectangular shape corresponding to the generally rectangular cross section of the locking stud.

In the preferred form, this arrangement allows the operator to place the shearing blade cartridge adjacent to the mounting block whereby the configuration of the threaded end of the locking stud and the threaded bore allows the threaded end to be freely inserted into the threaded bore. Once inserted, the locking stud is rotated to threadably engage the locking stud to the blade cartridge thereby securing the blade cartridge to the mounting block.

A further aspect of this embodiment includes a nut placed on the locking stud opposite the threaded end. The nut is operative during the set-up period to insure proper thread alignment between the stud and the blade cartridge. Once properly aligned, the nut is fixed on the locking stud to prevent further rotation.

In the second embodiment, a locking stud having an enlarged diameter head portion threadably engages the mounting block. The blade cartridge has a keyhole-shaped bore therein for slidable fitment with the locking stud. The keyhole-shaped bore has an enlarged circular portion of a diameter greater than the head portion and an elongated narrow slot-like portion having a width less than said head portion. In the preferred form, this arrangement allows the operator to insert the enlarged head portion of the fastener through the large circular portion of the blade cartridge and once the head portion clears the cartridge, the cartridge may be slid upwards and further back to allow the extending flange portion of the cartridge assembly to rest on the notches of the mounting block. The locking stud is then tightened and the large head portion bears upon the shoulder of the narrow slot-like portion to retain the blade cartridge in the mounted position.

Other objects and advantages of the invention will become apparent upon reading the following detailed description and upon reference to the drawings.

BRIEF DESCRIPTION OF THE DRAWINGS

FIG. 1 is an elevational view of a cut-off die set with a portion removed for clarity showing the shearing blade secured to the mounting block utilizing a first embodiment.

FIG. 2 is an exploded perspective view of the shearing blade mounting structure;

FIG. 3 is a section view taken along section 3—3 of FIG. 1;

FIG. 4 is an elevational view of a cut-off die set with a portion removed for clarity showing the shearing blade secured to the mounting block utilizing a second embodiment;

FIG. 5 is an exploded perspective view of the second embodiment of the shearing blade mounting structure; and FIG. 6 is a section view taken along section 6—6 of FIG. 4.

DETAILED DESCRIPTION OF THE PREFERRED EMBODIMENT

The illustrated cut-off die set 10 is adapted to be employed in a tube cutting press (not shown) and is slidably movable along a set of rails 11 which are part of the press base. The press includes a swinging or reciprocating ram mechanism (not shown) which bears against an upper platen 12 and serves to operate the cut-off die set 10. In die sets of the general type with which the present invention is concerned, the cut-off die set is positioned to receive the tubing as it emanates from the fabrication mill and the ram mechanism operates to cause the clamping jaws within the die set to clamp the die set to the rapidly moving tubing. The die set, clamped to the moving tube, moves together with the tube along the rails 11. The ram mechanism then causes the notching blade to make a notching cut in the upper periphery of the tubing whereafter the shearing blade is lowered to sever a length from the moving tube. Following the final severing cut, the ram mechanism, operating in a reverse manner, first causes retraction of the shearing blade and the notching blade and then unclamping of the die set from the tube section as the cut-off die set approaches the end of its travel on the rails 11. The cut-off die set is then returned to its initial position on the rails 11 preparatory to initiation of a new cut-off cycle. This description of a flying, double cut operation notwithstanding, the invention is also useful in stationary cut and single cut applications.

Cut-off die set 10 includes a upper platen 12 and a lower platen 14.

The tubing 34 emanating from the tube forming mill is clamped to the die set 10 by means of two pairs of die jaws 36 and 38 each having a complementary inner radius contour 40 and 42, conforming to the tube contour. The reciprocal clamping and disengaging movement of die jaws 36 and 38 is produced by sliding movement of an upper die jaw holder 44 and a lower die jaw holder 46 slidable on each other. The die clamping jaws 36 and 38 are adapted to be reciprocated towards and away from each other in synchronism with the movement of the upper platen relative to the lower platen by coaction of die jaw cam 24 passing between a pair of clamping rollers 48 and 50 carried respectively by the upper die jaw holder 44 and lower die jaw holder 46. The manner in which the cam 24 coacts with the rollers 48 and 50 to move the die jaws 36 and 38 into and out of clamping engagement with tube 34 will not be further described since this mechanism is known and is not part of the present invention. Further details of a mechanism of this type may be found in U.S. Pat. Nos. 4,108,029 and 4,294,147, both assigned to the assignee of the subject application, the disclosures of which are incorporated herein by reference.

A notching assembly seen generally at 56, having a notching blade holder 52 and a notching blade 54 operates to provide a notching cut in the upper periphery of the tube prior to the downward severing movement of the shearing blade. The notching cut precludes the necessity of further working of the severed tube section following the severing operation. Both thrust and "pull across" notching assemblies are known; see, for example U.S. Pat. Nos. 4,109,555 and 4,294,147, both assigned to the assignee of the subject application, the disclosures of which are herein incorporated by reference.

Notching assembly 56 is supported on a cross slide assembly 68 comprising upper and lower guide shafts supported by brackets on the lower platen 14. A cam follower is fixed to the cross slide 68 and follows a cam guide having a curvilinear cam track mounted to the upper platen. Movement of the upper platen 12 causes the cam guide to impart reciprocal motion to the cross slide 68. Further details of a cross slide mechanism of this type may be found in U.S. Pat. No. 4,766,792, assigned to the assignee of the subject application, the disclosure of which is herein incorporated by reference.

Turning now to the Figures, a mounting block 84 is fixed to the upper platen 12, using threaded fasteners 66 threadably received in bores 84b located on the mounting block 84. While threaded fasteners are used to fix the block 84 to the platen 12, other fastening means such as riveting, welding, or brazing could also be used. If so desired, block 84 could be formed as an integral part of platen 12. The mounting block 84 comprises a depending rear plate portion 84a, a top plate portion 84f and two depending side portions 84d having notches 84e cut therein.

A shearing blade 72 is mounted within a shearing blade cartridge 70 by means of threaded fasteners 73. Although threaded fasteners are used herein, other fastening means could also be used to affix the shearing blade 72 to blade cartridge 70, such as welding or brazing. If desired, the blade cartridge could be integrally formed, thus eliminating the use of any type of fastening means. The shearing blade 72 is made of a high speed steel having a sharpened cutting surface opposite the blade cartridge 70. Blade cartridge 70 comprises a back plate 74, spacer plates 78, 80, a shearing blade 72 and a clamping plate 76.

The back plate 74 of the shearing blade cartridge 70 has outwardly extending lateral flanges 74a forming a T-shaped blade holder which is slidably received in a T-shaped keyway formed by the notches 84e and the recessed portion or pocket of the mounting block 84. It will be seen that the forces during the cutting operation are substantially vertical and are thus borne by the upper platen 12 during the cutting operation and by mounting block 84, through the notch section 84e and corresponding flanges 74a of the back plate 74, during withdrawal of the shearing blade 72. The stresses on the locking stud 86 shown in the first embodiment or locking stud 100 shown in the second embodiment, when used in the described mounting system, are minimal so that the blade cartridge 70 is easily secured to and supported by the mounting block 84.

A change in the size or wall thickness of the tubing 34 being cut necessitates that different sizes of shearing blades be used to properly sever the tubing 34. Spacer plates 78,80 are used in combination with the clamping plate 76 and back plate 74 to properly align the shearing blade 72 so that a standard blade cartridge 70 can be used with different sizes of shearing blade 72. Obviously, when changing the width and/or thickness of the shearing blade 72, different shapes, sizes or combinations of spacer plates 78,80 are needed to affix the shearing blade 72 in the proper position on the shearing blade cartridge 70.

As shown in FIGS. 2 and 3, the blade cartridge 70 of the first embodiment is held in position on the mounting block 84 by a pair of locking studs 86. As each of the locking studs 86 are identical, only one is described herein. While the first embodiment discloses the use of two locking studs 86 (see FIG. 1), the blade cartridge 70 could be retained on the mounting block by a single locking stud 86.

Each locking stud 86 has a threaded end 87 having substantially parallel and opposite flat sides 87a and diametrically opposite threaded sides 87b together defining a generally rectangular shaped cross section. The locking stud 86 extends through the blade cartridge 70 (see FIG. 3) and is rotatably mounted in the transverse bore 84c of the mounting block 84. The locking stud 86 has a second threaded end 88 opposite the first threaded end 87. A nut 90, including a washer 91, threadably engages the second threaded end 88 of the locking stud to secure the stud to the mounting block 84. A pin 92 extending through the nut 90 and locking stud 86 is used to fix the nut 90 on the locking stud 86.

In operation, the shearing blade cartridge comprising the back plate 74, spacers 78,80, blade 72 and clamping plate 76 is held together by threaded fasteners 73 as previously discussed. The blade cartridge 70 is placed in the recessed portion or pocket of mounting block 84, i.e., adjacent the rear plate portion 84a and between the two depending side portions 84d, and is held securely in position by the locking stud 86. The blade cartridge is secured by inserting the threaded portion 87 of the locking stud 86 through the respective openings in each of the clamp plate 76, spacer plate 78,80, and shearing blade 72 and into a rectangular shaped opening 76a formed by opposite notched portions 76c on the clamp plate 76. Once inserted, the locking stud 86 is rotated 90°, using a hexagonal end 96 of the locking stud 86, to engage the threaded portion 87 of the locking stud 86 with the threaded portion 76b of the clamp plate 76 as shown in FIG. 1.

The use of spacer plates 78,80, allows the standard width of the cartridge 70 to remain constant. Thus the operator need only make up the locking stud 86/clamp plate 76 arrangement one time. To properly align the threaded interface 76b of the clamping plate 76 with the threaded end 87 of the locking stud 86, the blade cartridge 70 is placed in the holding block 84, and the locking stud 86 is inserted through both the blade cartridge 70 and mounting block 84, until the threaded portions of the locking stud 87b and the clamp plate 76b are adjacent. The locking stud 86 is then rotated to engage the threaded end 87 with the threaded portion 76b of clamp plate 76. A lock nut 90 and washer 92 are placed on the threaded portion 88 of the locking stud 86 extending outward from the mounting block 84. The nut 90 is tightened on the locking stud 86 until the blade cartridge 70 is securely positioned in the mounting block 84. Once the blade cartridge 70 is securely positioned, a pin 90 is placed through the nut 92 and the locking stud 86 to prevent further movement of the nut 90 on the locking stud 86.

Once properly aligned, the blade cartridge 70 is released from the mounting block 84 by rotating the locking stud 90° which disengages the threaded end 87 from the clamp plate 76 enabling the operator to slide the blade cartridge 70 out of the mounting block 84. Rotation of the locking stud 86 is accomplished through use of a wrench or other suitable tool on the hexagonal end 96 of the locking stud 86.

As shown in FIGS. 5 and 6, the blade cartridge 70 is held in position on the mounting block 84 by a locking stud 100 having an enlarged head portion 100a. The locking stud 100 acts in combination with a keyhole-shaped bore hole 102 extending through the back plate 74, the spacer plate 78, the shearing blade 72 and the clamp blade 76. The keyhole-shaped bore 102 has an enlarged circular portion having a diameter greater than the diameter of the head portion of the locking stud, and an elongated narrow slot-like portion having a width less than the diameter of the head portion 100a of the locking stud 100.

As shown in FIG. 5, the back plate 74 and spacer plate 78 may also include an elongated enlarged circular portion. The elongated circular portion combined with the flange member 78a on the spacer plate 78 allows for two blade settings, thus allowing the operator to reposition a blade shortened by sharpening. FIGS. 5 and 6 illustrate a first blade setting, wherein fasteners 73 pass through a first upper set of mounting holes 72b in the shearing blade and blade 72 lies flush with the upper surface of the spacer plate 78 and the top surface 72a of the blade 72 is driven downward during the severing stroke by the top plate 84f of the mounting block 84. To position the blade in the second setting, the threaded fasteners 73 are removed and the spacer plate 78 is reversed so that the flange 78a of the spacer plate 78 now extends over the top surface 72a of the shearing blade 72 and transmits the driving force from the upper platen 12 to the blade 72 whereafter the blade cartridge is reassembled with fasteners 73 now passing through a second, lower set of mounting holes 72c in the shearing blade.

In operation, the blade cartridge comprises the back plate 74, spacer plate 78, blade 72 and clamping plate 76 held together by threaded fasteners 73. Once assembled, the blade cartridge is slidably fit over the enlarged portion 100a of the locking stud 100 which is threaded to the mounting block 84. The enlarged head portion 100a of the locking stud 100 passes through the enlarged circular portion of the keyhole-shaped bore. Once the head portion protrudes through the clamping plate 76, the cartridge assembly 70 is then slid upwards along the elongated slot portion allowing the laterally extending flange 1 portions 74a of the back plate 74 to slide onto the notched portion 84e of the mounting block. The locking stud 100a is then tightened down allowing the undersurface of the enlarged head portion 100a to mate with the shoulders created by the elongated slot portion of the keyhole-shaped bore 102, thus retaining the blade cartridge in position.

As previously set forth, the forces during cutting operation are substantially vertical and are thus applied by the upper platen 12 during the cutting operation and by the mounting block 84 through the notched portions 84e and the corresponding flanges 74a of the back plate, during the withdrawal of the shearing blade. As in the first embodiment, the stresses is on the locking stud 100 of the second embodiment are minimal, whereby both arrangements adequately secure the blade cartridge 72 to mounting block 84.

The described mounting arrangement for the shearing blade will be seen to provide a firm positive support for the blade throughout its reciprocal motion used in accomplishing the shearing stroke. Specifically, the described support mechanism for the shearing blade allows the shearing blade to be quickly and efficiently removed and replaced in the mounting block.

Although preferred embodiments of the invention have been described in detail, it will be apparent that various changes may be made in the disclosed embodiments without departing from the scope or spirit of the invention. Moreover, the terms "vertical" and/or "horizontal" are used here in a relative sense; they do not suggest any given orientation of the mechanism as described and placed during actual use. We claim:

We claim:

1. An apparatus for mounting a shearing blade to a cut-off die set comprising:

a mounting block secured to a platen of the cut-off die set;

a shearing blade cartridge including a back plate and a clamp plate adapted to sandwich a shearing blade therebetween;

a locking stud having a threaded end, said threaded end having substantially parallel and opposite flat sides and opposite threaded sides defining a generally rectangular shape cross section, mounted for rotation in the mounting block; and said shearing blade cartridge having a threaded bore therein, said threaded bore having opposite notched portions defining a generally rectangular shape corresponding to the generally rectangular cross section of the threaded end of the locking stud, said threaded end and threaded bore being configured so as to allow the threaded end to be freely inserted into the threaded bore prior to rotating the locking stud so as to threadably engage the blade cartridge to the locking stud, thereby securing the blade cartridge in the mounting block.

2. An apparatus for mounting a shearing blade according to claim 1 wherein said threaded end comprises a first threaded end, said locking stud includes a second threaded end opposite said first threaded end, and a nut is threadably engaged on such second threaded end.

3. An apparatus for mounting a shearing blade according to claim 1 wherein said mounting block comprises a depending rear plate portion having a transverse bore therethrough, two depending side portions having notches thereon, and said blade cartridge having outwardly extending flange portions which fit slidably into the notches of the side portions.

4. An apparatus for mounting a shearing blade according to claim 2 wherein said nut is operative during the initial set-up to insure proper thread alignment between said first threaded end and said threaded bore, a pin extending through said nut and said second threaded end prevents further rotation of the nut after initial set-up.

5. A shearing blade mount for a cut-off die set comprising a mounting block secured to a platen of the cut-off die set and a shearing blade cartridge, including a shearing blade, detachably secured to the mounting block, characterized in that a bore having threaded portions is provided in the cartridge, a shaft member is provided having a first end having flat sides and threaded sides, the shaft member is rotatably mounted in the mounting block with the first end of the shaft received in the bore in the cartridge, and the shaft is mounted for rotation between a first angular position in which the flat sides of the first end coincide with the threaded portion of the bore to allow the cartridge to be detached from the mounting block and a second angular position in which the threaded sides of the shaft threadably engage the threaded portions of the bore to secure the cartridge to the mounting block.

6. An apparatus fc · mounting a shearing blade to a cut-off die set comprising:

a mounting block having a depending plate portion and two depending side plate portions having notched portions forming a T-shaped keyway;

a T-shaped blade cartridge sized to be slidably received in said keyway comprising a back plate, having outwardly extending flange portions, and a shearing blade fastened to the back plate; and a locking stud securing said blade cartridge to said mounting block;

said locking stud being connected to said mounting block and including an enlarged diameter head portion;

said blade cartridge having a keyhole-shaped bore therein for slidable fitment with said locking stud;

said keyhole-shaped bore having an enlarged circular portion of diameter greater than said head portion and an elongated slot-like portion having a width less than the diameter of said head portion.

7. An apparatus for mounting a shearing blade to a cut-off die set comprising a mounting block secured to a platen of the cut-off die set, a shearing blade cartridge including a back plate and a clamp plate adapted to sandwich the shearing blade therebetween;

a locking stud having a threaded end and an enlarged diameter head portion, said threaded end threadably engaging said mounting block; and said shearing blade cartridge having a keyhole-shaped bore therein for slidable fitment with said locking stud, said keyhole-shaped bore having an enlarged circular portion of diameter greater than said head portion and an elongated narrow slot-like portion having a width less than the diameter of said head portion, said keyhole-shaped bore being configured so as to allow the blade cartridge to be freely inserted over the enlarged head portion of the locking stud wherein the blade cartridge is then moved so that the large head portion is adjacent the elongated narrow slot-like portion after which the locking stud may be tightened down on the narrow slot-like portion to secure the blade cartridge to the mounting block.

8. An apparatus for mounting a shearing blade to a cut-off die set according to claim 8 wherein:

a shearing blade mount for mounting the shearing blade in two positions comprises a clamp plate, a shearing blade, a back plate and a spacer plate having a flange extending from one face of said spacer plate so that when in a first position, said spacer plate is mounted adjacent s id shearing blade having said flange extending away from said shearing blade so that during the cutting operation the severing force is applied directly to the upper surface of the shearing blade and in a second position said spacer plate is mounted adjacent said shearing blade having said flange extending above the shearing blade so that during the cutting operation the severing force is transmitted from the upper platen of the die set through the flange portion of the spacer plate to the shearing blade.

9. An apparatus according to claim 7 wherein said shearing blade has a keyhole shaped bore therein.

10. An apparatus according to claim 9 wherein said shearing blade further includes at least one mounting hole therein to facilitate clamping of the shearing blade between said back plate and said clamp plate.

11. An apparatus according to claim 10 wherein said shearing blade includes a plurality of mounting holes spaced vertically on said blade to allow a plurality of positions of vertical adjustment of said blade relative to said back plate and said clamp plate.

* * * * *